United States Patent
Bande et al.

(10) Patent No.: US 7,827,141 B2
(45) Date of Patent: Nov. 2, 2010

(54) DYNAMICALLY SIZING BUFFERS TO OPTIMAL SIZE IN NETWORK LAYERS WHEN SUPPORTING DATA TRANSFERS RELATED TO DATABASE APPLICATIONS

(75) Inventors: Amit Bande, Bangalore (IN); Krishna Mohan Itikarlapalli, Bangalore (IN); Debashish Chatterjee, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 578 days.

(21) Appl. No.: 10/908,069

(22) Filed: Apr. 27, 2005

(65) Prior Publication Data

US 2006/0206453 A1  Sep. 14, 2006

(30) Foreign Application Priority Data

Mar. 10, 2005  (IN)  ............ 238/CHE/2005

(51) Int. Cl.
*G06F 15/16* (2006.01)
(52) U.S. Cl. .............. 707/622; 709/227; 709/230
(58) Field of Classification Search ............ 707/3, 707/622
See application file for complete search history.

(56) References Cited

U.S. PATENT DOCUMENTS

| | | | | |
|---|---|---|---|---|
| 5,745,753 A * | 4/1998 | Mosher, Jr. | ............... | 707/202 |
| 5,960,446 A * | 9/1999 | Schmuck et al. | ............ | 707/610 |
| 6,061,763 A * | 5/2000 | Rubin et al. | ............... | 711/129 |
| 6,098,076 A * | 8/2000 | Rekieta et al. | ............. | 707/202 |
| 6,442,748 B1 * | 8/2002 | Bowman-Amuah | ......... | 717/108 |
| 6,496,850 B1 * | 12/2002 | Bowman-Amuah | ......... | 709/203 |
| 6,516,337 B1 * | 2/2003 | Tripp et al. | ............... | 709/202 |
| 6,529,909 B1 * | 3/2003 | Bowman-Amuah | .......... | 707/10 |
| 6,539,396 B1 * | 3/2003 | Bowman-Amuah | ..... | 707/103 R |
| 6,550,057 B1 * | 4/2003 | Bowman-Amuah | ......... | 717/126 |
| 6,571,282 B1 * | 5/2003 | Bowman-Amuah | ......... | 709/219 |
| 6,615,253 B1 * | 9/2003 | Bowman-Amuah | ......... | 709/219 |
| 6,640,244 B1 * | 10/2003 | Bowman-Amuah | ......... | 709/207 |
| 6,741,982 B2 * | 5/2004 | Soderstrom et al. | ........... | 707/3 |
| 6,832,255 B1 * | 12/2004 | Rumsewicz et al. | ......... | 709/227 |
| 6,859,811 B1 * | 2/2005 | Chandrasekaran et al. | .. | 707/200 |
| 6,957,221 B1 * | 10/2005 | Hart et al. | ................... | 707/100 |
| 7,031,987 B2 * | 4/2006 | Mukkamalla et al. | ....... | 707/204 |
| 7,200,626 B1 * | 4/2007 | Hoang et al. | ................ | 707/204 |
| 7,315,896 B2 * | 1/2008 | Van Hensbergen et al. | .. | 709/228 |
| 7,318,075 B2 * | 1/2008 | Ashwin et al. | ............. | 707/203 |
| 7,406,481 B2 * | 7/2008 | Saha et al. | ............... | 707/104.1 |
| 7,433,903 B1 * | 10/2008 | Shapiro et al. | ............. | 707/204 |
| 7,440,965 B1 * | 10/2008 | Pruthi et al. | ................ | 707/102 |

(Continued)

OTHER PUBLICATIONS

Robert Braden, RFC 1122, Oct. 1989, Internet Engineering Task Force, pp. 1-115.*

(Continued)

*Primary Examiner*—Pierre M Vital
*Assistant Examiner*—Christopher P Nofal
(74) *Attorney, Agent, or Firm*—Narendra Reddy Thappeta

(57) ABSTRACT

In transferring data from/to a database server, the size of a network buffer used by a network layer is dynamically adjusted according to the call type and expected size of data to be transferred for the call. Due to such use of appropriate buffer size, throughput performance of the transfer may be enhanced.

20 Claims, 4 Drawing Sheets

U.S. PATENT DOCUMENTS

| | | | |
|---|---|---|---|
| 7,634,574 B2* | 12/2009 | Senga et al. | 709/230 |
| 2001/0029502 A1* | 10/2001 | Oeda | 707/10 |
| 2001/0039550 A1* | 11/2001 | Putzolu | 707/205 |
| 2002/0129022 A1* | 9/2002 | Majewski et al. | 707/10 |
| 2002/0194203 A1* | 12/2002 | Mosher, Jr. | 707/200 |
| 2003/0037029 A1* | 2/2003 | Holenstein et al. | 707/1 |
| 2003/0115190 A1* | 6/2003 | Soderstrom et al. | 707/3 |
| 2003/0115224 A1* | 6/2003 | Obara et al. | 707/204 |
| 2003/0131027 A1* | 7/2003 | Holenstein et al. | 707/201 |
| 2003/0135502 A1* | 7/2003 | Hun et al. | 707/100 |
| 2003/0187884 A1* | 10/2003 | Holenstein et al. | 707/202 |
| 2003/0208511 A1* | 11/2003 | Earl et al. | 707/204 |
| 2004/0098495 A1* | 5/2004 | Warren et al. | 709/230 |
| 2004/0117375 A1* | 6/2004 | Saha et al. | 707/10 |
| 2004/0215670 A1* | 10/2004 | Holenstein et al. | 707/201 |
| 2004/0220897 A1* | 11/2004 | Bernhart et al. | 707/1 |
| 2004/0243647 A1* | 12/2004 | Oheda | 707/200 |
| 2004/0249870 A1* | 12/2004 | Jeevanjee et al. | 707/204 |
| 2005/0080825 A1* | 4/2005 | Fleck et al. | 707/201 |
| 2005/0182800 A1* | 8/2005 | Ashwin et al. | 707/203 |
| 2005/0256908 A1* | 11/2005 | Yang et al. | 707/200 |
| 2006/0106770 A1* | 5/2006 | Vries | 707/3 |
| 2006/0235889 A1* | 10/2006 | Rousseau et al. | 707/104.1 |
| 2010/0100529 A1* | 4/2010 | Erofeev | 707/610 |

OTHER PUBLICATIONS

Sams Publishing, "MySQL Optimization, part 2", Apr. 20, 2005, Ziff Davis, Dev Shed, pp. 1-28.*

Rob Flickenger, "Chatper 6: Performance Tuning", Oct. 2006, INASP/ICTP, "How to Accelerate Your Internet", pp. 177-233.*

* cited by examiner

DYNAMICALLY SIZING BUFFERS TO OPTIMAL SIZE IN NETWORK LAYERS WHEN SUPPORTING DATA TRANSFERS RELATED TO DATABASE APPLICATIONS

BACKGROUND OF THE INVENTION

1. Field of the Invention

The present invention relates to database technologies, and more specifically to a method and apparatus for dynamically sizing buffers to optimal size in network layers when supporting data transfers related to database applications.

2. Related Art

Database applications are often implemented on a network. In an example scenario, a client system (of an application executing thereon) sends a query to either write or read data from a server system. Accordingly, data is transferred on the network from the client system to the server system in the case of a write operation and from the server system to the client system in the case of a read operation. The query can be between two server systems as well, even though the description is provided with respect to the combination of a client system and a server system. The client and server systems are commonly referred to as database systems.

To facilitate communication over the network, a network layer is generally implemented in each of the database systems. In general, the network provides an interface using which the higher layers on the database system can send (or receive) data to (from) another system with a network address. For example, in the case of Internet Protocol (IP) based networks, socket based interface represents such an interface with the network layer.

Buffers ("network buffer") are often used in network layers to facilitate data transfers. In general, the higher layers store data in a network buffer, and the network layer then transfers the data in the network buffer. Similarly, even during receive operations, the received data is stored in a network buffer, and higher layers may then read the data from the network buffer.

The size of network buffers may impact the performance of various systems, which are implementing database applications. For example, in one embodiment, the data may be transferred only after a network buffer is full. Accordingly, if the buffer size is too large, the data may not be transferred to the system at the other end for a long duration, and an unacceptably low throughput performance may result.

On the other hand, if a buffer size is too small, the buffer may need to be filled multiple times to effect a large data transfer. According to one prior approach, system calls are used to place data into the buffer as well as for the network layer to transfer the data to the network. As system calls generally consume substantial system resources, the overall throughput performance of the systems may again be affected.

In one prior embodiment, the network buffer size is configured to be of a fixed size statically based on the system to which a connection is sought to be established. The buffer size may be specified by a configuration file maintained by a database administrator. One problem with such a static buffer size is that the network buffer may not be suitable for at least some of the data transfers between database systems.

BRIEF DESCRIPTION OF THE DRAWINGS

The present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

An aspect of the present invention adjusts the size of the network buffers when supporting data transfers related to database applications. In an embodiment, the network buffer size is determined based on the type of database call in progress, and the data size used by the call in progress. As is well known in the relevant arts, a connection is first established from a database application at one database system to another database system, and each call typically corresponds to a store or retrieve (select) operation. Due to such dynamic change of the network buffer size, the overhead of data transfer (e.g., minimization of system calls) may be reduced and/or throughput performance of applications may be enhanced.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the features of the invention.

2. Example Environment

Figure 1:
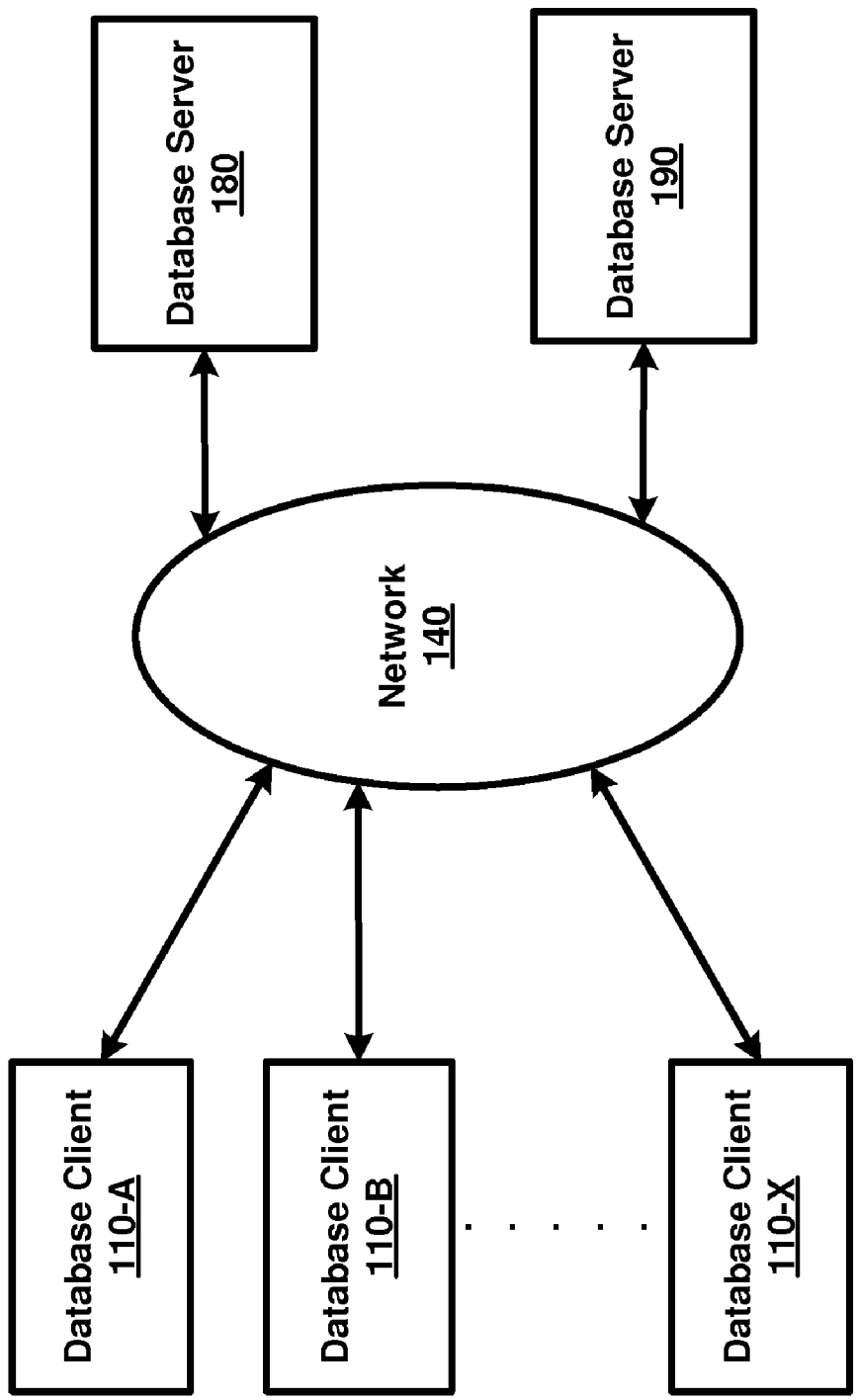
FIG. 1 is a block diagram illustrating an example environment in which various features of the present invention can be implemented.

FIG. 1 is a block diagram illustrating the details of an example environment in which the present invention can be implemented. The block diagram is shown containing database clients 110-A through 110-X, network 140, and database servers 180 and 190. Each block is described below in detail.

It should be understood that only representative example components are shown in the diagram so as not to obscure various features of the present invention. However, it will be apparent to one skilled in the relevant arts that environments may contains many other (both in number and type) components implemented, without departing from the scope and spirit of various aspects of the present invention.

Network 140 provides connectivity between database clients 110-A through 110-X and database servers 180 and 190, with each of the clients and the servers being referred to as a database system. Network 140 may contain several devices (e.g., bridges, routers, modems, communication links, etc.,) operating according to protocols such as TCP/IP well known in the relevant arts. However, other forms (e.g., point-to-point private network using proprietary protocols or ATM-based network) can also be used to provide connectivity between the clients and the database system.

Database clients 110-A through 110-X enable users to store/retrieve data into/from database servers 180 and 190. For illustration, it is assumed that user applications supported by database client 110-A may need to store/retrieve data from database server 190. However, database client 110-A may access other database servers (not shown) and other database clients (110-B through 110-X) may also access database server 190 in a similar manner.

Database client 110-A may support multiple user applications which enable users to store/retrieve data into/from database server 190. In general, a connection is established from a user application to a database server (typically to a database of interest), and then calls are generated by applications to perform desired operations. The calls are transmitted on network 140 and corresponding responses are received from database server 190.

Each of database servers 180 and 190 provides a repository for storing various pieces of information (or data), and may store/retrieve data on receiving a request (from database client). For example, name, address, employee code, salary details, attendance details etc., corresponding to each employee of the organization can be stored and retrieved based on the corresponding requests. In general, database servers allow database clients to store/retrieve desired data using structured queries (such as SQL, well known in the relevant arts).

While the description of above is provided with respect to connections and calls from database clients to database servers, it should be appreciated that corresponding desired operations can be implemented between database server systems as well. Various features of the present invention can be implemented in both database servers and database clients, which are collectively referred to as database systems. The description is continued with reference to an example architecture for database systems in which various aspects of the present invention can be implemented.

3. Database System

Figure 2:
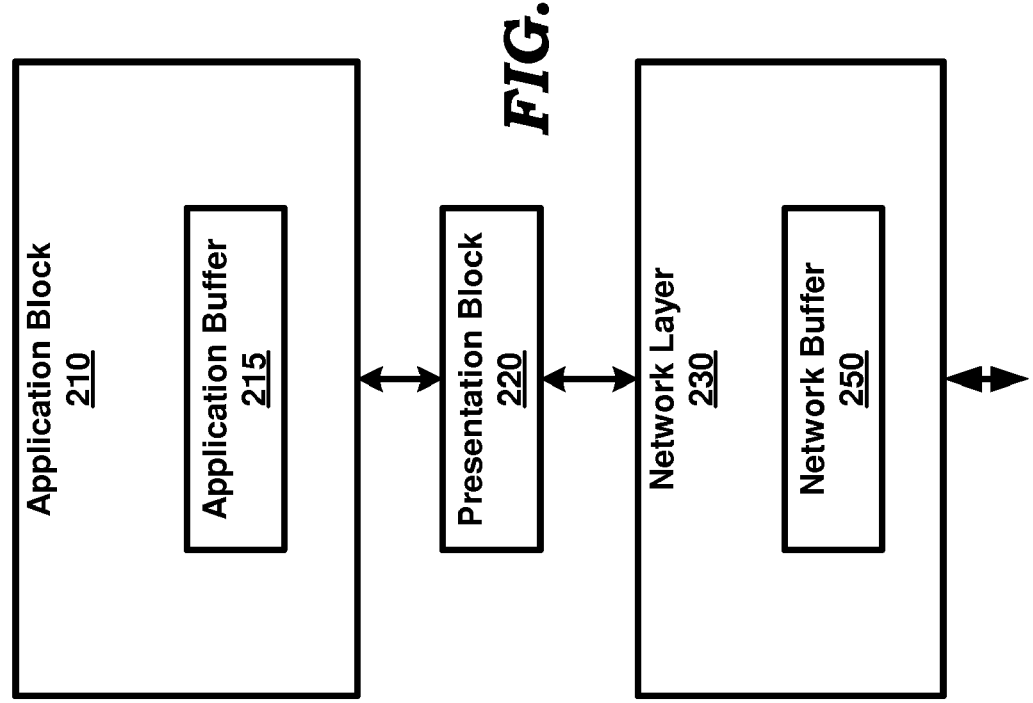
FIG. 2 is a block diagram illustrating the details of an embodiment of a database system implemented according to an aspect of the present invention.

FIG. 2 is a block diagram illustrating the details of an example database system in which various aspects of the present invention can be implemented. As noted above, a database system can corresponding to any of database clients 110-A through 110-X and database servers 180 and 190. The database system is shown containing application block 210, presentation block 220, and network layer 230. Application block 210 and network layer 230 are respectively shown containing application buffer 215, and network buffer 250. The manner in which the database system operates to use an optimal size for network buffer 250, is described below in further detail.

Application block 210 corresponds to a user application (either in a server or a client) which initiates various operations (store, retrieve) to a database server. In general, the operations are initiated according to a pre-specified interface. An example interface (Oracle Call Interface, "OCI") is described in a document entitled, "Oracle Call Interface Programmer's Guide Release 2 (9.2)", Part Number A96584_01, available from the assignee of the subject application, Oracle International Corporation.

In such an embodiment, application block 210 establishes a connection to a database server of interest, and initiates several calls on the same connection. Connection management (establishing, termination) can be performed in a known way.

Presentation block 220 generally supports the features of the presentation layer. In particular, presentation block 220 shields the higher layers from differences in data formats which may be employed by different systems. Accordingly, presentation block 220 converts the data types (as needed) while sending data to network layer 230 as well as when receiving the data from network layer 230.

Network layer 230 provides the transport for data to be transferred from/to application block 210 (via presentation block 220). Network layer 230 may be implemented based on TCP/IP protocol suite, well known in the relevant arts.

Network buffer 250 provides the shared memory space for presentation block 220 and network layer 230 to exchange data (which is either transmitted or received). Network buffer 250 can potentially be provided at different memory locations (i.e., with some or no overlap) for different calls. In general, network buffer 250 is used for buffering the data either to be stored in the database (in the case of store related calls) or retrieved from the database (in the case retrieve database calls).

As noted above in the background section, the size (number of memory locations in the case of a random access memory (RAM)) of network buffer 250 needs to be optimum for a superior performance of the database systems. The manner in which such superior performance can be attained is described below with respect to FIG. 3.

4. Optimum Buffer Size

Figure 3:
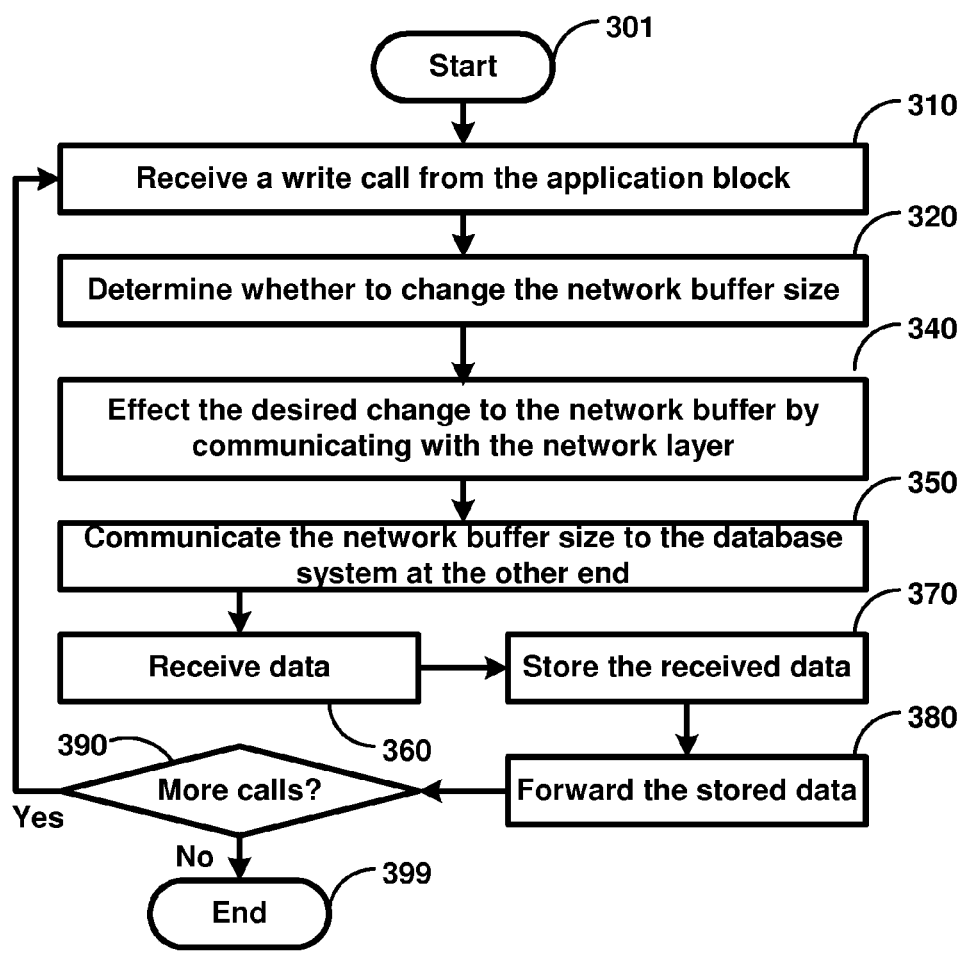
FIG. 3 is a flow-chart illustrating the manner in which data can be transferred efficiently between two database systems according to an aspect of present invention.

FIG. 3 is a flowchart illustrating the manner in which an optimum buffer size can be provided between a database application block and a network layer, according to an aspect of the present invention. The flow-chart is described with reference to presentation block 220 of FIG. 2 merely for illustration. However, the buffer management may be performed by other blocks of a database system as well as in other environments. The flowchart starts in step 301, in which control immediately transfers to step 310.

In step 310, presentation block 220 receives a write call from application block 210. The call is received on a connection which is setup earlier by application block 210. It should be appreciated that the received call can correspond to (or be generated in response to) one or more of calls generated according to OCI, noted above.

In step 320, presentation block 220 determines whether to change the network buffer size for the call. In an embodiment, the buffer size is determined based on the call type and the size of the data expected to be transferred in the call. In general, call types such as those related to (storing and retrieval) graphics data and large objects (LOBs) typically transfer large volumes of data. Accordingly, a larger network buffer size is used in relation to calls related to graphics data/LOBs. On the other hand, for select statements retrieving a small amount of data, only a small buffer size may be used.

In step 340, presentation block 220 effects the desired changes to the size of network buffer 250 by communicating with network layer 230. In one embodiment, a small network buffer size (2 Kbytes) is maintained as the default buffer size, and presentation block 220 requests network layer 230 for an increase in network buffer (250) size when a large number of bytes are expected to be transferred for a corresponding call. Network layer 230 grants the request and communicates the changed size to presentation block 220.

In step 350, presentation block 220 may communicate the allocated buffer size to the system at the other end (of the connection). Such communication may further enhance the efficiency of transfer, however, the underlying TCP/IP protocol generally ensures accurate transfers even if there is a buffer size mismatch. The allocated buffer size can be communicated using various approaches such as 'piggy-backing' the information along with the data being transferred for the call (according to some pre-specified convention), or using custom protocol to communicate the information. The system at the other side can adjust the buffer size accordingly, thereby enhancing the overall throughput performance of the transfer.

In step 360, network layer 230 receives data on network 140. In step 370, the received data is stored in network buffer 250, and forwarded to presentation block 220 in step 380. In one embodiment, the network buffer size is reset to a default value once the call is complete.

In step 390, a determination is made as to whether additional calls are there on the present connection. In general, application block 210 closes the connection once all the calls related to the database (to which the calls are directed) are completed. If a next call is present, control passes to step 310, or else to step 399, in which the flow chart ends.

While the dynamic buffer size adjustment is described above with respect to write operations, it should be appreciated that the approaches are applicable to read operations as well. However, in the read call, the application block at the other end (which would 'write to' the database system originating the read call) initiates the resizing of the network buffer.

Thus, due to the dynamic adjustment of the buffer size in relation to potentially each call, an optimum buffer size may be provided in transferring data to/from database servers. Various embodiments can be implemented using the approaches described above. The description is continued with respect to an embodiment in which various features of the present invention are operative by execution of appropriate software instructions in a digital processing system.

5. Software Implementation

Figure 4:
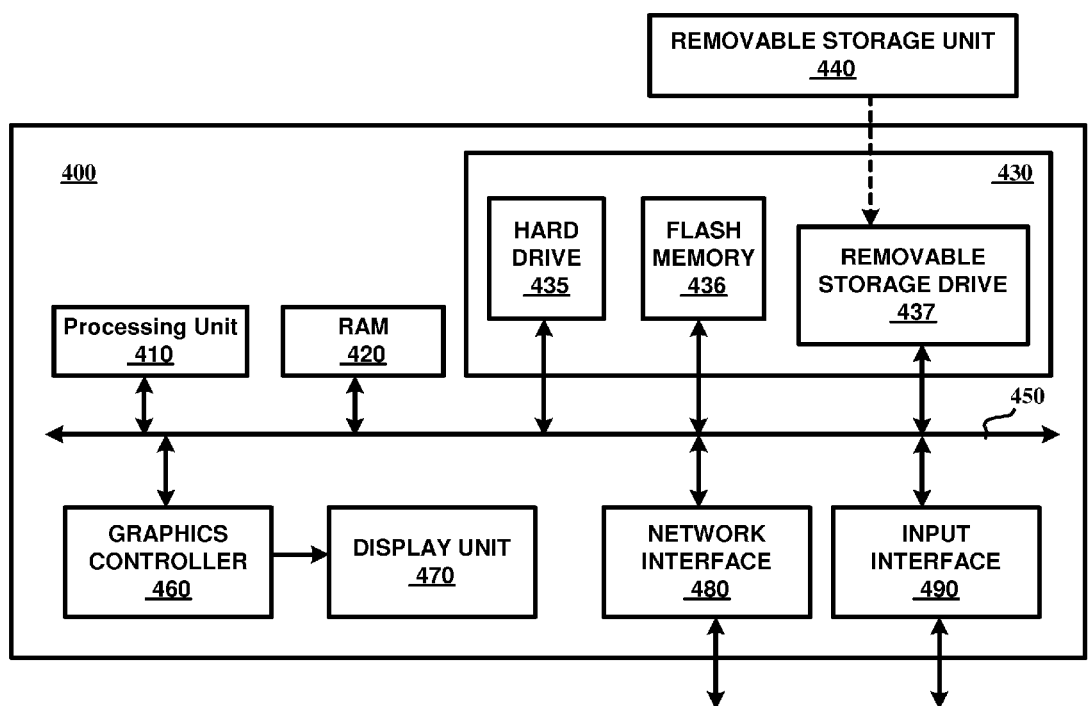
FIG. 4 is a block diagram illustrating the details of an embodiment in which various aspects of the present invention are operative by execution of software instructions in an embodiment of the present invention.

FIG. 4 is a block diagram illustrating the details of digital processing system 400 implemented substantially in the form of software in an embodiment of the present invention. Digital processing system 400 corresponds to one of database clients 110-A through 110-X and database servers 180 and 190. Digital processing system 400 may contain one or more processors such as processing unit 410, random access memory (RAM) 420, secondary memory 430, graphics controller 460, display unit 470, network interface 480, and input interface 490. All the components except display unit 470 may communicate with each other over communication path 450, which may contain several buses as is well known in the relevant arts. The components of FIG. 4 are described below in further detail.

Processing unit 410 may execute instructions stored in RAM 420 to provide several features of the present invention. Processing unit 410 may contain multiple processors, with each processor potentially being designed for a specific task. Alternatively, processing unit 410 may contain only a single processor. RAM 420 may receive instructions and data from secondary memory 430 and network interface 480 using communication path 450. In addition, RAM 420 may provide the memory space to support buffer 350 described above.

Graphics controller 460 generates display signals (e.g., in RGB format) to display unit 470 based on data/instructions received from processing unit 410. Display unit 470 contains a display screen to display the images defined by the display signals. Input interface 490 may correspond to a key_board and/or mouse, and generally enables a user to provide various inputs (e.g., request/query). Network interface 480 enables some of the inputs (and outputs) to be provided on a network and also to interface with database server 190 or database client 110-A through 110-X. Display unit 470, input interface 490 and network interface 480 may be implemented in a known way.

Secondary memory 430 may contain hard drive 435, flash memory 436 and removable storage drive 437. Secondary memory 230 may store the data (e.g., processing load, network speed, session identifier, connection path identifier etc) and software instructions which cause digital processing system 400 to provide several features in accordance with the present invention. Some or all of the data and instructions may be provided on removable storage unit 440, and the data and instructions may be read and provided by removable storage drive 437 to processing unit 410. Floppy drive, magnetic tape drive, CD_ROM drive, DVD Drive, Flash memory, removable memory chip (PCMCIA Card, EPROM) are examples of such removable storage drive 437.

Removable storage unit 440 may be implemented using medium and storage format compatible with removable storage drive 437 such that removable storage drive 437 (or any machine) can read the data and instructions. Thus, removable storage unit 440 includes a computer readable storage medium having stored therein computer software and/or data.

In this document, the term "computer program product" is used to generally refer to removable storage unit 440 or hard disk installed in hard drive 435. These computer program products are means for providing software to digital processing system 400. Processing unit 410 may retrieve the software instructions, and execute the instructions to provide various features of the present invention as described above.

Thus, efficient transfer of data between a database server and a database client may be supported according to an aspect of the present invention.

6. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A computer implemented method of transferring data from a first database system to a second database system using multiple computing layers, said computing layers containing an application layer, a network layer, and a set of intermediate layers between said network layer and said application layer, said method being performed in said first database system, said method comprising:

in a database application comprised in an application layer of said set of upper layers implemented in said first database system, formulating a first call and then a second call, both said first call and said second call for transferring respective data to an application layer in said second database system;

receiving in said set of intermediate layers, said first call and then said second call;

at said set of intermediate layers, estimating a first expected amount of data and a second expected amount of data to be transferred for said first call and said second call respectively, wherein said first expected amount of data is larger than said second expected amount of data;

at said set of intermediate layers, determining a first TCP/IP buffer size based on said first expected amount of data and determining a second TCP/IP buffer size based on said second expected amount of data, wherein said first TCP/IP buffer size is larger than said second TCP/IP buffer size when said first expected amount of data is larger than said second expected amount of data;

communicating from said set of intermediate layers to said network layer said first TCP/IP buffer size used for transferring data associated with said first call and said second TCP/IP buffer size used for transferring data associated with said second call;

at said network layer, providing a first TCP/IP buffer of said first TCP/IP buffer size for transferring data of said first call and providing a second TCP/IP buffer of said second TCP/IP buffer size for transferring data of said second call, wherein said first TCP/IP buffer size is more than said second TCP/IP buffer size in response to said communicating;

storing in said first TCP/IP buffer a first data provided in said first call, and storing in said second TCP/IP buffer a second data provided in said second call; and transferring said first data stored in said first TCP/IP buffer and said second data stored in said second TCP/IP buffer to said second database system via TCP/IP.

2. The method of claim 1, wherein said set of intermediate layers comprises a presentation layer at which said estimating, said determining and said communicating are performed, wherein said presentation layer converts said first data and said second data into corresponding data consistent with a format suitable for said second database system.

3. The method of claim 2, wherein said estimating is according to a type of said first call and said second call.

4. The method of claim 3, wherein said type said first call is of large object (LOB) type, whereby larger buffer size is determined for transferring the data provided in said first call.

5. The method of claim 2, wherein said first call and said second call are generated on a single connection set up between said first database system and said second database system.

6. The method of claim 5, wherein said presentation layer receives said first call and said second call after said single connection is set up.

7. The method of claim 2, wherein said network layer uses system calls for storing data related to calls in TCP/IP buffers, wherein a number of said system calls are reduced due to said estimating and said determining.

8. The method of claim 1, further comprising:
communicating said first TCP/IP buffer size to said second database system such that said second database system can adjust a size of a corresponding TCP/IP buffer used while receiving said first data.

9. The method of claim 1, further comprising:
receiving an indication of a third TCP/IP buffer size used by said second database system for sending a third data corresponding to a third call,
wherein said providing provides a third TCP/IP buffer of said third TCP/IP buffer size in said first database system;
storing said third data in said third TCP/IP buffer upon receipt from said second database system; and
forwarding said third data stored in said third TCP/IP buffer to said database application.

10. The method of claim 1, wherein said first call is a write call.

11. A computer readable storage medium storing one or more sequence of instructions causing a first data base system to transfer data to a second database system using multiple computing layers, said computing layers containing an application layer, a network layer, and a set of intermediate layers between said network layer and said application layer, wherein execution of said one or more sequences of instructions by one or more processors contained in said first database system causes said first database system to perform the actions of:

in a database application comprised in an application layer of said set of upper layers implemented in said first database system, formulating a first call and then a second call, both said first call and said second call for transferring respective data to an application layer in said second database system;

receiving in said set of intermediate layers, said first call and then said second call;

at said set of intermediate layers, estimating a first expected amount of data and a second expected amount of data to be transferred for said first call and said second call respectively, wherein said first expected amount of data is larger than said second expected amount of data;

at said set of intermediate layers, determining a first TCP/IP buffer size based on said first expected amount of data and determining a second TCP/IP buffer size based on said second expected amount of data, wherein said first TCP/IP buffer size is larger than said second TCP/IP buffer size when said first expected amount of data is larger than said second expected amount of data;

communicating from said set of intermediate layers to said network layer said first TCP/IP buffer size used for transferring data associated with said first call and said second TCP/IP buffer size used for transferring data associated with said second call;

at said network layer, providing a first TCP/IP buffer of said first TCP/IP buffer size for transferring data of said first call and providing a second TCP/IP buffer of said second TCP/IP buffer size for transferring data of said second call, wherein said first TCP/IP buffer size is more than said second TCP/IP buffer size in response to said communicating;

storing in said first TCP/IP buffer a first data provided in said first call, and storing in said second TCP/IP buffer a second data provided in said second call; and transferring said first data stored in said first TCP/IP buffer and said second data stored in said second TCP/IP buffer to said second database system via TCP/IP.

12. The method of claim 11, wherein said set of intermediate layers comprises a presentation layer at which said estimating, said determining and said communicating are performed, wherein said presentation layer converts said first data and said second data into corresponding data consistent with a format suitable for said second database system.

13. The method of claim 12, wherein said first call and said second call are generated on a single connection set up between said first database system and said second database system.

14. The method of claim 12, wherein said network layer uses system calls for storing data related to calls in TCP/IP buffers, wherein a number of said system calls are reduced due to said estimating and said determining, and wherein said first call is a write call.

15. The method of claim 11, further comprising:
communicating said first TCP/IP buffer size to said second database system such that said second database system can adjust a size of a corresponding TCP/IP buffer used while receiving said first data.

16. A first database system for transferring data to a second database system using multiple computing layers, said computing layers containing an application layer, a network layer, and a set of intermediate layers between said network layer and said application layer, said first database system comprising:
- a memory to store a set of instructions;
- one or more processors to retrieve and execute said set of instructions, which cause said first database system to perform the actions of:
  - in a database application comprised in an application layer of said set of upper layers implemented in said first database system, formulating a first call and then a second call, both said first call and said second call for transferring respective data to an application layer in said second database system;
  - receiving in said set of intermediate layers, said first call and then said second call;
  - at said set of intermediate layers, estimating a first expected amount of data and a second expected amount of data to be transferred for said first call and said second call respectively, wherein said first expected amount of data is larger than said second expected amount of data;
  - at said set of intermediate layers, determining a first TCP/IP buffer size based on said first expected amount of data and determining a second TCP/IP buffer size based on said second expected amount of data, wherein said first TCP/IP buffer size is larger than said second TCP/IP buffer size when said first expected amount of data is larger than said second expected amount of data;
  - communicating from said set of intermediate layers to said network layer said first TCP/IP buffer size used for transferring data associated with said first call and said second TCP/IP buffer size used for transferring data associated with said second call;
  - at said network layer, providing a first TCP/IP buffer of said first TCP/IP buffer size for transferring data of said first call and providing a second TCP/IP buffer of said second TCP/IP buffer size for transferring data of said second call, wherein said first TCP/IP buffer size is more than said second TCP/IP buffer size in response to said communicating;
  - storing in said first TCP/IP buffer a first data provided in said first call, and storing in said second TCP/IP buffer a second data provided in said second call; and
  - transferring said first data stored in said first TCP/IP buffer and said second data stored in said second TCP/IP buffer to said second database system via TCP/IP.

17. The first database system of claim 16, wherein said set of intermediate layers comprises a presentation layer at which said estimating, said determining and said communicating are performed,
wherein said presentation layer converts said first data and said second data into corresponding data consistent with a format suitable for said second database system.

18. The first database system of claim 17, wherein said first call and said second call are generated on a single connection set up between said first database system and said second database system.

19. The first database system of claim 17, wherein said network layer uses system calls for storing data related to calls in TCP/IP buffers, wherein a number of said system calls are reduced due to said estimating and said determining, and wherein said first call is a write call.

20. The first database system of claim 16, further comprising:
communicating said first TCP/IP buffer size to said second database system such that said second database system can adjust a size of a corresponding TCP/IP buffer used while receiving said first data.

* * * * *